Oct. 16, 1956  C. A. KING  2,766,841
CLEAN-OUT DEVICE FOR PLUMBING FIXTURES
Filed Feb. 10, 1953
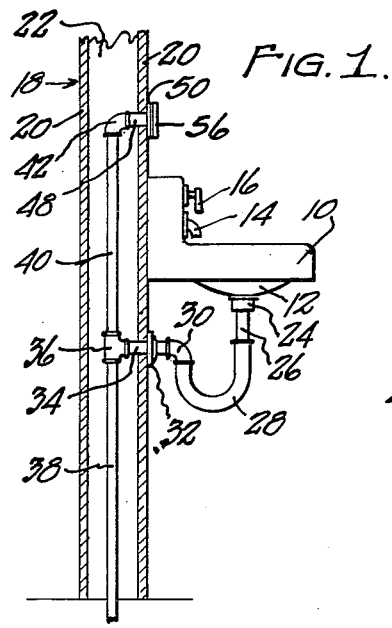
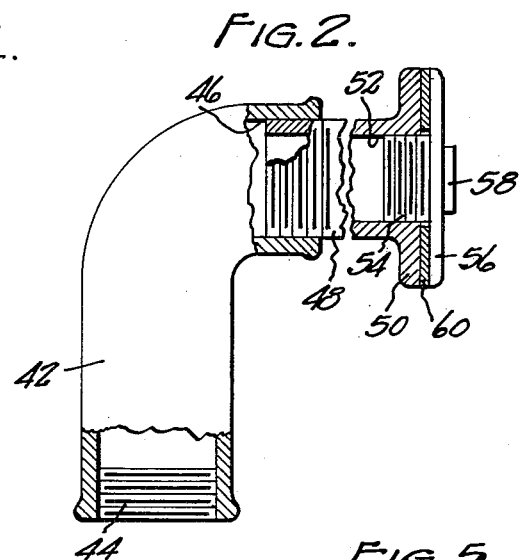
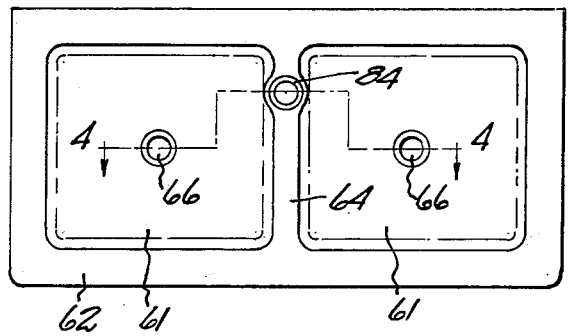
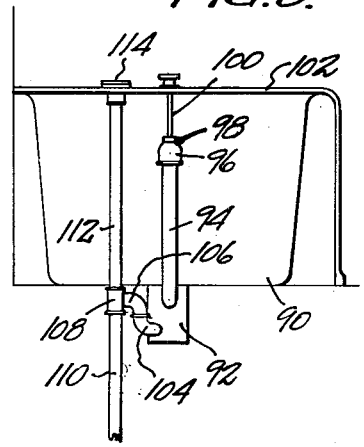
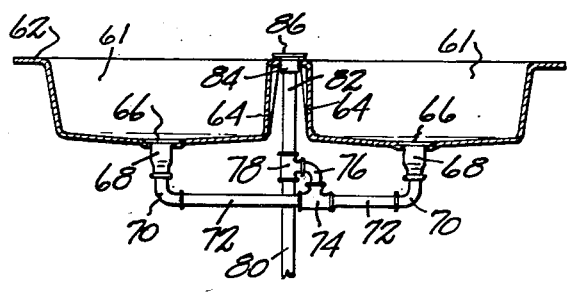
CLARE A. KING
INVENTOR.
BY Eugene C. Turblock
ATTORNEY.

United States Patent Office 2,766,841
Patented Oct. 16, 1956

---

2,766,841

CLEAN-OUT DEVICE FOR PLUMBING FIXTURES

Clare A. King, Elkhart, Ind.

Application February 10, 1953, Serial No. 336,052

1 Claim. (Cl. 182—7)

This invention relates to improvements in clean-out devices for plumbing fixtures. More particularly, it relates to a device for cleaning out the drains of such plumbing fixtures as lavatories, sinks and bath tubs.

In the usual construction and installation of plumbing fixtures, such as lavatories, sinks and bath tubs, a trap is provided in the outlet line and, in the event the outlet line becomes plugged, it is necessary to remove this trap in order to probe the outlet with a cable or other cleaning tool. This probing action, because of the removal of the trap, must take place in a dry condition, or at least it is not customarily the practice to use water for the purpose of washing away obstructions in the line after they have been disengaged and loosened. Consequently, as the probing member is withdrawn, any items which have accumulated or adhered thereto are withdrawn, and objectional dirt and mess results. Furthermore, it is not possible to test the line to ascertain whether the probing has been effective until after the probing member has been removed and the trap has been reconnected. If such a test reveals that the obstruction has not been released and that the line is still plugged, it is necessary again to remove the trap and to proceed with the probing operation.

It is the primary object of this invention to meet and overcome these conditions and to make possible the continuous flushing of the line during a probing action so that by observing the rate of flow or drainage from the fixture, the operator knows when the cleaning action has become successful, and also to permit the probing tools to be flushed and cleaned before they are withdrawn from the line so as to avoid the adherence thereto of the items which obstructed the line and were released by the probe.

A further object is to provide a device of this character wherein a conduit is connected to an outlet line at or adjacent the discharge end of a trap to accommodate the insertion of a probing tool therethrough into the line below the trap, said conduit extending to a level at and above the level at which liquid extends within the plumbing fixture and being provided with a releasable closure at its mouth to prevent gases and odors from passing from the line through the conduit into the atmosphere adjacent the plumbing fixture.

Other objects will be apparent from the following specification.

In the drawing:

Fig. 1 is a view illustrating the invention applied to a lavatory.

Fig. 2 is an enlarged fragmentary detail sectional view of the device.

Fig. 3 is a top plan view illustrating the application of the invention to a multiple unit such as a double sink.

Fig. 4 is a sectional view taken on line 4—4 of Fig. 3.

Fig. 5 is a view illustrating the application of the invention to a plumbing fixture, such as a bath tub.

Referring to the drawing, and particularly to Figs. 1 and 2 which illustrate the application of the invention to a lavatory, the numeral 10 designates a lavatory of the type having a bowl 12 adapted to receive water discharged from a water outlet or faucet 14 under the control of a valve 16. This lavatory will preferably be mounted upon a building wall 18 which will preferably have opposed spaced continuous wall surfaces 20 supported and separated by spaced vertical studs 22. The lavatory 10 may either be mounted or anchored upon the wall 18 or may be supported upon legs or other supports (not shown) with the bowl or fixture spaced from the wall 18.

The bowl 12 of the lavatory will have the usual drain opening at the bottom thereof at which is connected a fixture or fitting 24, here illustrated as connected with an outlet conduit 26. A trap in the nature of a J-shaped or return bent conduit 28 has one end connected with the bowl outlet, as by means of connection with the conduit 26, although it will be understood that the trap member 28 may be connected directly to the fitting 24 if desired. The trap member 28 will preferably have legs of unequal length and will be connected to the lavatory bowl outlet at the longer of the two legs. An elbow or like fitting 30 will be connected to the other leg of the trap 28 to be positioned spaced below the level of the bowl 12 but above the lowermost part of the trap. An escutcheon plate 32 may be mounted upon the wall 18 in line with the elbow 30, and a horizontal conduit 34 will be connected to the elbow 30 to extend through the escutcheon plate 32 for support thereby. The conduit 34 will be of comparatively short length to extend through one of the wall members 20 and into the inner wall space. A T-shaped fitting 36 is positioned within the inner wall space with its intermediate or central leg connected to the conduit 32. The aligned legs of the T will be positioned substantially vertically and the outlet conduit 38 for the fixture will extend downwardly from the lowermost leg of the T fitting.

A conduit 40 mounts an elbow 42 at its upper end. As illustrated in Fig. 2 the elbow 42 will preferably be interiorly screw-threaded at its lower end at 44 for screw-threaded connection with the upper end of the conduit 40 and will be interiorly screw-threaded at 46 at its opposite end. A sleeve or tube member 48 is carried by the upper end of the elbow 42 and preferably terminates in an annular mounting flange 50 at its end. The tubular member 48 will extend through the wall portion 20 so that the flange 50 may be exposed at the inner surface of the wall portion 20 above the level of the lavatory.

The manner in which the parts are interconnected may vary, but as illustrated in Fig. 2 the tubular member 48 is exteriorly screw-threaded for connection at the interiorly screw-threaded part 46 of the elbow 42. The flange portion 50 will preferably be interiorly screw-threaded at 52 for the reception of the externally screw-threaded portion 54 of a closure member which may include a portion 56 confronting the flange 50 to conceal the same. Where a screw-threaded member is provided, means for the engagement of a tool, such as a projecting lug 58 or the like, will be convenient. In order to effect a seal to prevent leakage of gas into the room through the conduit opening, a gasket 60 will preferably be interposed between the flange 50 and the closure plate 56. The specific construction of mounting of the closure is illustrative, and it will be understood that other types of closures and other means of securing them of a character well understood in the art, may be employed in place of the screw-threaded member 54.

When it is desired to probe line 38, in the event the same or lines connected therewith becomes plugged, the closure plate 56 is removed and a probing member, such as a cable or a tight wound coil wire member of the type commonly called a "snake," or any other type found convenient, may be inserted through the open end of the tube 48 to extend therethrough and through the elbow 42, the conduit 40, and the T fitting 36, into the outlet pipe 38. As this member is advanced and manipulated, water may be fed into the pipe 38, as from the faucet 14. The drainage of this water from the bowl 12 of the sink can be observed as the manipulation of the probing member continues, and, as soon as satisfactory drainage is established, the workman is assured that he has accomplished his purpose of releasing the obstruction in the outlet line 38. Thereupon he may withdraw the probe. As the probe is withdrawn, the supply of water may continue so that the water will wash the probe as it is withdrawn and the probe will be substantially clean as it is released through the mouth of the tube 48 of the access member.

In the use of this clean-out, it will be observed that it has not been necessary to disconnect any part of the outlet line, and also it will be apparent that the location of the access opening above the lavatory is one which enables the workman to work in a comfortable position. The extension of the line 40 to a level above the sink insures against water backing up in the line to an extent that it is discharged at 48. In this connection it will be apparent that water would overflow the bowl 12 before it could be discharged at the outlet 48.

In Figs. 3 and 4, the invention has been illustrated as applied to a fixture in the nature of a double sink. This fixture is of the character commonly used for a kitchen sink or for stationary wash tubs and entails the provision in a single unit of two sinks or receptacles 61 arranged side by side and preferably outlined by a marginal flange 62 around the level of the top of the two sink units. The sinks are separated by upwardly extending wall portions 64. Each sink has an outlet opening 66 at its bottom and, as here illustrated, fittings 68 communicate with or are mounted in those openings 66 and each has connection through an elbow 70 with a conduit 72. The conduits 72 are preferably aligned and, in the arrangement here shown, are joined together by the aligned legs of a T fitting 74. In this connection it will be understood, however, that the manner in which the outlet fixtures 68 of the two sinks are connected is illustrative and is not intended to be limiting, and that any type of connection found suitable may be employed.

In the form here illustrated an elbow 76 projects upwardly from the intermediate leg of a T fitting 74 and in turn is connected to the center leg of a T fitting 78, which aligned legs are positioned substantially vertically. An outlet 80 extends from the lower leg of the T 78. It will be seen, therefore, that the parts 74, 76, 78 and 80 define a trap for both of the sink units, for which purpose the T 78 will preferably be located at a level above the level of the conduits 72 and below the level of the bottom of the sink units. A conduit 82 is connected with the upwardly projecting leg of the T fitting 78 and in turn extends to a fitting 84 mounted in an opening in the rim portion of the sink. As here shown, this fitting is mounted in the rib or intermediate portion of the unit which separates the two sinks. A closure member 86 is releasably mounted upon the fitting 84. It will be apparent that the same advantages and functions mentioned above with respect to the construction illustrated in Figs. 1 and 2 are available in this construction, and it will be apparent that a probe can be used conveniently and easily by simply inserting the same through the fitting 84, into the conduit 82, through the aligned legs of the T fitting 78, into the outlet 80. Likewise it will be apparent that water may be discharged from one or both of the sinks to pass into the outlet conduit 80 during the probling operation.

In the embodiment illustrated in Fig. 5, the invention is applied to a bath tub 90 of the type having an outlet connected with a cylindrical member 92 which usually houses a valve. An overflow conduit 94 is connected at its lower end with the cylindrical housing 92 intermediate its height and extends around the end of the tube to a fitting 96 located intermediate the height of the tube and communicating with an opening in the side wall of the tub. Valve operating mechanism is included in this device, and a part thereof passes through the conduit 94 having access thereto through a fitting 98 on the elbow 96. Thus a part of this valve-operating mechanism may include a shaft or rod 100 which extends upwardly from the fitting 98 and through the tub rim 102.

An outlet, such as an elbow 104, extends from the lower end of the valve housing 92 and in turn has connection with an elbow, as at 106, to a T fitting 108 whose aligned legs are positioned vertically. An outlet conduit 110 is connected with the lower of the aligned T legs and cooperates with the parts 104, 106, and 108 to define a trap. A conduit 112 is connected upwardly from the T fitting 108 and has its end connected at and in communication with an opening in the bath tub rim 102. A cover 114 is detachably mounted upon the rim to close the upper end of the conduit 112. It will be apparent that this construction applies to a bath tub the same advantages of convenient clean-out that are applied to the lavatory and the sink constructions previously described.

While the preferred embodiments of the invention have been illustrated and described, it will be understood that changes in the construction may be made within the scope of the appended claim without departing from the spirit of the invention.

I claim:

In combination, a plumbing fixture including a water receptacle having a drain outlet, a drain line connected to said outlet and including a liquid trap below the level of the outlet of said receptacle, a conduit communicating with said drain line, said trap being interposed between said receptacle and the point of connection of said conduit with said line, said conduit extending to a level at least as high as the upper part of said receptacle, and a closure removably spanning the upper end of said conduit, said receptacle having a rim portion at its upper end provided with an aperture, and a fitting mounted in said aperture and connected to the upper end of said conduit to support said closure.

References Cited in the file of this patent
UNITED STATES PATENTS

| | | |
|---|---|---|
| 559,188 | Moore | Apr. 28, 1896 |
| 926,552 | Doyle | June 29, 1909 |
| 1,114,881 | Hayes | Oct. 27, 1914 |
| 1,174,549 | Cully | Mar. 7, 1916 |
| 1,268,379 | Murphy | June 4, 1918 |
| 1,521,492 | Warren | Dec. 30, 1924 |
| 1,938,064 | Carmine | Dec. 5, 1933 |
| 1,994,526 | McCloskey | Mar. 19, 1935 |